PENN, GEISS & BROSIUS.
Grain Drill.
No. 2,640 Reissued June 4, 1867.
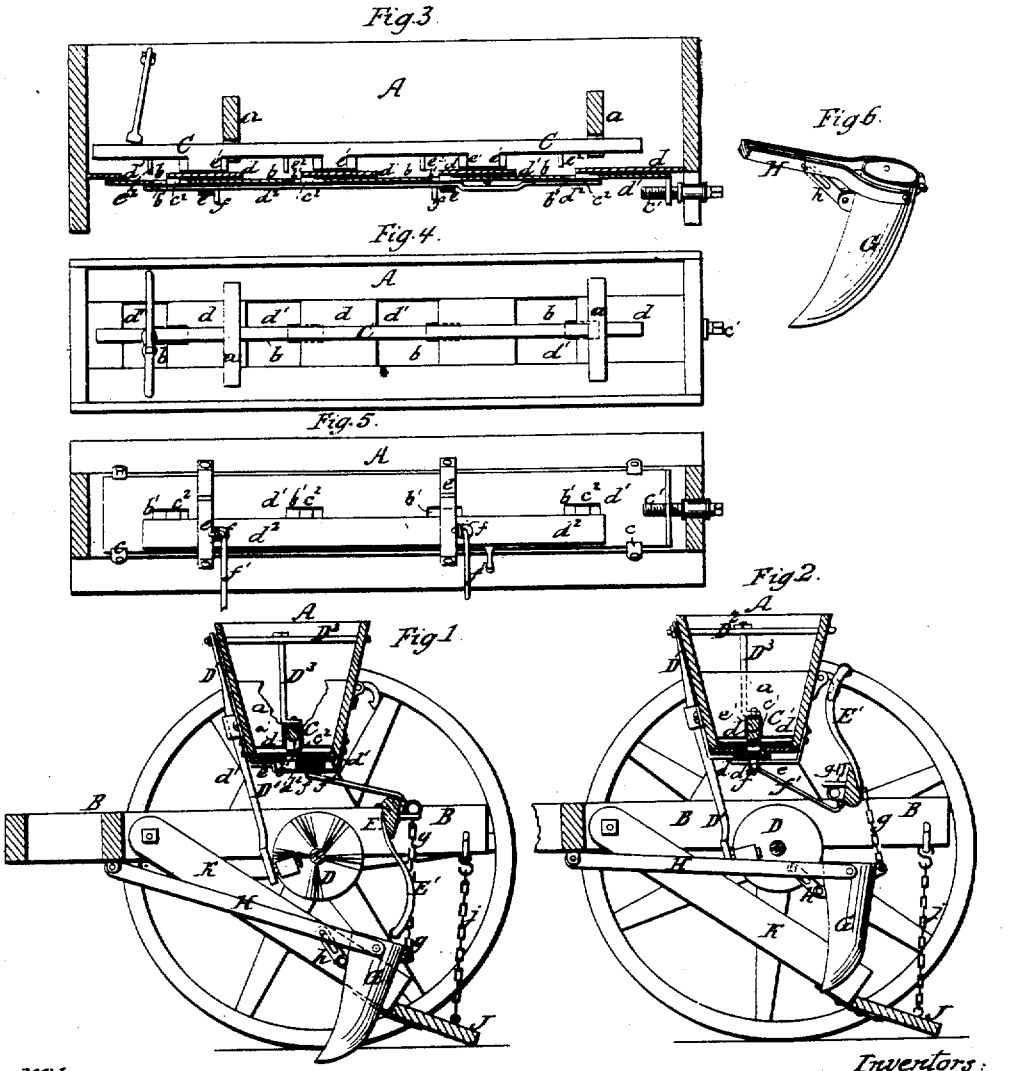
Witnesses:
A. F. Campbell
E. Schafer.
Inventors:
W. P. Penn Jacob Geiss
Jacob Brosius
by his atty
Marcus Fenwick Lawrence
N. PETERS, PHOTO-LITHOGRAPHER, WASHINGTON, D. C.

BEST AVAILABLE COPY

UNITED STATES PATENT OFFICE.

WORDEN P. PENN, JACOB GEISS, AND JACOB BROSIUS, OF BELLEVILLE, ILLINOIS.

GRAIN-DRILL.

Specification forming part of Letters Patent No. 48,432, dated June 27, 1865; antedated December 27, 1864; Reissue No. 2,640, dated June 4, 1867.

*To all whom it may concern:*

Be it known that we, WORDEN P. PENN, JACOB GEISS, and JACOB BROSIUS, of Belleville, in the county of St. Clair and State of Illinois, have invented certain new and useful Improvements in Grain-Drills; and we do hereby declare that the following is a full, clear, and exact description thereof, reference being had to the accompanying drawings, and to the letters of reference marked thereon, making a part of this specification.

Figure 1 represents a vertical longitudinal section; Fig. 2, a similar view with the several parts thrown out of action; Fig. 3, a vertical longitudinal section of the hopper; Fig. 4, a top view of the hopper; Fig. 5, a bottom view of the hopper; Fig. 6, a perspective of one of the flukes and its drag-bar, with the mode of attachment.

The nature of our invention consists, first, in a novel arrangement of adjustable seed-slides in the bottom of the seed box or hopper for the purpose of more effectually and readily adjusting the flow of the seed therefrom, or for shutting off the flow entirely, and in conjunction therewith it consists in a peculiarly-formed reciprocating agitator for insuring a free flow of seed from the hopper, as will be hereinafter described; secondly, in connecting one of the regulating-slides at the bottom of the seed-box with an oscillating bar, and also connecting the teeth through which the seed are dropped with said bar, all in such a manner that by a single movement of a lever the flow of seed from the hopper can be entirely shut off, and simultaneously therewith the teeth elevated free from the ground, or by a reverse movement of said lever these parts can be put into operative position again, as will be hereinafter described; thirdly, in the application of a pendent and, if desirable, adjustable support to the frame of the machine for the purpose of supporting a man behind the hopper to attend the machine, as will be hereinafter described; fourthly, in pivoting the teeth through which the seed are dropped to hinged arms, and again connecting said teeth to these arms by means of adjustable pivoted braces, as will be hereinafter described.

In the accompanying drawings, A represents the seed box or hopper for containing seed to be planted. This hopper is separated into three apartments by the two division-boards *a a*, and mounted upon the carriage-frame B, above which this hopper is elevated by the standards, as represented in Figs. 1 and 2.

In the bottom of the hopper is a thin board or plate, *d*, which is securely fixed in its place, and provided with a number of longitudinally-oblong holes, *b b b*, for the escape of seed. Below this perforated bottom *d* is another thin plate, *d′*, which is held in contact therewith by the fingers *c c c*, (shown in Fig. 5,) and which is also provided with oblong holes *b′ b′*, equal in width to those through the bottom of the hopper, though not quite as long. This plate or slide has one of its ends turned down and tapped for receiving the screw-pin C′, by means of which the openings through which the seed flow from the hopper can be shortened—*i. e.*, by adjusting the plate *d′* longitudinally.

In Figs. 3 and 5 we have represented small blocks $c^2$ $c^2$ projecting from the plate *d* just under one edge of each opening, *b*, and forming checks to prevent the seed from getting under the plate *d*. These blocks are secured to the upper plate, and serve a very important office in the machine, as above stated.

Beneath the longitudinally-adjustable slide *d′* is a narrow plate, $d^2$, extending along the bottom of the hopper as far as the perforations extend, and kept in contact with the slide *d′* by means of straps *c c*, which allow this plate $d^2$ to be moved backward and forward in a direction at right angles to the movement of the slide *d′*, the object of which movement is to contract the seed-openings laterally or to entirely close them when the machine is not in operation.

On top of the plate *d*, and guided by the division-boards *a a*, is a longitudinal central agitator, C, having double-beveled edge-stirrers *e e*, projecting down from its bottom edge and so arranged as to work over the intermediate spaces between the perforations through *d′*, and keep the seed in the hopper over these perforations and ready to flow through them. Besides these projections *e′* there is a pin, $e^2$, projecting from the bar of the agitator C over each hole *b*, for the purpose of keeping these holes always open, or, in other words, to prevent the

BEST AVAILABLE COPY seed from clogging up the holes *b*. The agitator C receives a reciprocating motion from a circular waved or cam plate, D, on the axle of the carriage-wheels, through the medium of a vibrating lever, D′, vibrating rod $D^2$, and a forked arm $D^3$, as shown in Figs. 1 and 3. The lower end of the lever D is forked, and carries two friction-wheels, against which cam-plate D works. The laterally-sliding plate $d^2$ has eyes *f*, projecting from its lower side, for receiving the hooked ends of rods *f′ f′*, which are pivoted at their opposite ends to a narrow rocking bar, B, which has its pivot-bearings on the side beams of the carriage-frame B. This pivoted bar E has a curved arm or handle, E′, secured to it in such a position that when the parts are all in one position for operation this handle will hang down, as represented in Fig. 1. Then when said handle is moved around and hooked to the back of the seed-box A, as shown in Fig. 2, the slide $d^2$ will have closed the holes through the seed-box and shut off the flow of the seed.

From the rocking bar E depend chains *g*, which connect with eyes projecting from the back part of the tubular teeth G, and, as these teeth are connected to hinged rods H, the movement of the handle E in the act of closing the seed-holes in the hopper will at the same time elevate the teeth above the ground, as represented in Fig. 2.

The teeth G are hollow, tapering, and shovel-pointed, and receive the seed from the hopper A through flexible tubes, or in any other suitable manner, and conduct the seed into the ground. These teeth are pivoted to the forked ends of rods H, which are themselves pivoted to the forward part of the carriage-frame, as shown in Figs. 1 and 2, and to the front side of each tooth a short brace, *h*, is pivoted, the upper end of which is again pivoted to the rod H by means of a pin passing through an oblong slot in the brace. This connection of the teeth to their hinged bars will allow of their being adjusted at different inclinations, and also allow of these teeth accommodating themselves to the surface of the ground traveled over. We propose in practice to employ wooden pins at such points as may be found necessary when these parts are liable to meet with obstructions.

In the rear of the teeth, or in the rear part of the machine at any suitable point, a board, J, is suspended by chains *j*, attached to the side beams of the frame, as shown in Figs. 1 and 2. Said boards are rigidly connected to hinged beams K K, which are also connected to the side bars of the frame A.

The object of the board J is to furnish a stand, or, if desirable, a seat for a man stationed behind the machine to attend to the adjusting of the parts thereof, and by taking up (shortening) or lengthening the chain *j* the height of the stand-board can be adjusted to suit the convenience of the attendant.

In our invention we do not confine ourselves to the use of the braces *h*, only as shown to the hinged arms H, pivoted to the teeth G, as shown, as the arms H can be pivoted to the teeth G in front and the braces *h* pivoted to the teeth G laterally—*i. e.*, to their sides—or the brace *h* can be pivoted also to the teeth G in front.

Having thus fully described our invention, what we claim as new, and desire to secure by Letters Patent, is—

1. Bracing the drill-tooth to its drag-bar by means of a separate brace in such a manner as to allow it to fold forward without breaking the wood pin, substantially as set forth.

2. The arrangement consisting of slides C, fixed plates *d*, with check-pieces $e^2$ and movable plates *d′* $d^2$, in combination with the hopper, all constructed, arranged, and operating in the manner and for the purposes specified.

3. The costruction of agitating-slide with double-beveled projections *e′ e′* and cleaning-pins $e^2$, in combination with the divisions *a a*, vibrating hangers $D^3$, and seed-distributing devices shown, substantially as and for the purposes specified.

4. The long cut-off plate *d*, arranged with the plates *d d′* and slide *c*, and connected with the drill-teeth by means of the pivoted vibrating bar E and chains *g*, and operated by a handle, E′, all in the manner and for the purposes specified.

5. The pendent stand-board J, arranged, substantially as described, upon a seed-drill, for the purposes set forth.

As evidence that we claim the foregoing we hereunto set our hands in the presence of witnesses.

W. P. PENN.
JACOB GEISS.
JACOB BROSIUS.

Witnesses:
CH. EIERKRISS,
WILLIAM EIERKRISS.